United States Patent
Backhaus et al.

(10) Patent No.: US 10,377,064 B2
(45) Date of Patent: Aug. 13, 2019

(54) APPARATUS AND METHOD FOR CONTINUOUSLY MANUFACTURING COMPONENTS FROM FIBER-REINFORCED COMPOSITES, AND MOLD SET

(71) Applicant: Airbus Operations GmbH, Hamburg (DE)

(72) Inventors: Sascha Backhaus, Hamburg (DE); Robert Gaitzsch, Leipzig (DE); Christian Fuerste, Halberstadt (DE)

(73) Assignee: Airbus Operations GmbH, Hamburg (DE)

( * ) Notice: Subject to any disclaimer, the term of this patent is extended or adjusted under 35 U.S.C. 154(b) by 306 days.

(21) Appl. No.: 15/184,430

(22) Filed: Jun. 16, 2016

(65) Prior Publication Data

US 2016/0361846 A1    Dec. 15, 2016

Related U.S. Application Data

(63) Continuation of application No. PCT/EP2014/076870, filed on Dec. 8, 2014.

(30) Foreign Application Priority Data

Dec. 19, 2013    (DE) .................. 10 2013 226 753

(51) Int. Cl.
*B29C 70/34* (2006.01)
*B29C 43/02* (2006.01)
(Continued)

(52) U.S. Cl.
CPC ............ *B29C 43/021* (2013.01); *B29C 33/34* (2013.01); *B29C 70/50* (2013.01); *B29D 35/0054* (2013.01); *B29L 2031/001* (2013.01)

(58) Field of Classification Search
CPC ........ B29C 70/00; B29C 70/34; B29C 70/345; B29C 70/40; B29C 70/50; B29C 70/504; B29C 70/525; B29C 70/54
See application file for complete search history.

(56) References Cited

U.S. PATENT DOCUMENTS

| 4,824,354 A | 4/1989 | Keaton |
| 6,171,091 B1 | 1/2001 | Bettencourt |

(Continued)

FOREIGN PATENT DOCUMENTS

| CN | 100418850 | 1/2007 |
| CN | 102781649 | 11/2012 |

(Continued)

OTHER PUBLICATIONS

German Search Report, dated Jul. 30, 2014, priority document.

(Continued)

*Primary Examiner* — Joseph S Del Sole
*Assistant Examiner* — Thu Khanh T Nguyen
(74) *Attorney, Agent, or Firm* — Greer, Burns & Crain Ltd.

(57) ABSTRACT

An apparatus for continuously manufacturing components from fiber-reinforced composites comprises a conveying device, configured to convey a semifinished product containing reinforcing fibers through the apparatus, a forming device, configured to bring the semifinished product into a desired shape, and a press with a first pressing element and a second pressing element arranged opposite the first pressing element. The forming device further comprises a plurality of differently shaped molds that are pressurizable by the press, a mold application station arranged upstream of the press relative to the conveying direction of the semifinished product through the apparatus for applying a mold to a section of the semifinished product, and a mold release (Continued)

station arranged downstream of the press relative to the conveying direction of the semifinished product through the apparatus for releasing the mold from the section of the semifinished product.

16 Claims, 11 Drawing Sheets

(51) Int. Cl.
    *B29C 70/50* (2006.01)
    *B29C 33/34* (2006.01)
    *B29D 35/00* (2010.01)
    *B29L 31/00* (2006.01)

(56) References Cited

U.S. PATENT DOCUMENTS

| | | | |
|---|---|---|---|
| 6,319,446 | B1 | 11/2001 | Bettencourt |
| 9,102,103 | B2 * | 8/2015 | Fox ..................... B29C 70/34 |
| 2007/0023572 | A1 | 2/2007 | Muller et al. |
| 2009/0065977 | A1 | 3/2009 | Suzuki et al. |
| 2011/0206906 | A1 | 8/2011 | Rubin et al. |
| 2013/0134621 | A1 | 5/2013 | Tsotsis et al. |
| 2013/0142997 | A1 | 6/2013 | Hofmann |
| 2013/0156880 | A1 | 6/2013 | Kim |

FOREIGN PATENT DOCUMENTS

| | | |
|---|---|---|
| CN | 102958663 | 3/2013 |
| CN | 103213285 | 7/2013 |
| DE | 102004001078 | 7/2005 |
| DE | 102007041971 | 3/2009 |
| DE | 102007062111 | 7/2009 |
| DE | 102008041832 | 3/2010 |
| DE | 102010002988 | 9/2011 |
| EP | 1819503 | 8/2007 |
| EP | 2418062 | 2/2012 |
| JP | H07148850 A | 6/1995 |
| JP | 2008055772 A | 3/2008 |
| NL | 1008421 | 9/1998 |
| WO | 8810186 | 12/1988 |
| WO | 0069612 | 11/2000 |
| WO | 2011076756 | 6/2011 |

OTHER PUBLICATIONS

International Search Report, dated Jun. 10, 2015, Priority Document.
"Cordis" IMAC-PRO Report, dated Sep. 1, 2013.
Chinese Office Action dated Feb. 24, 2017, priority document.
Search report dated Sep. 6, 2018 from corresponding Japanese application.

* cited by examiner

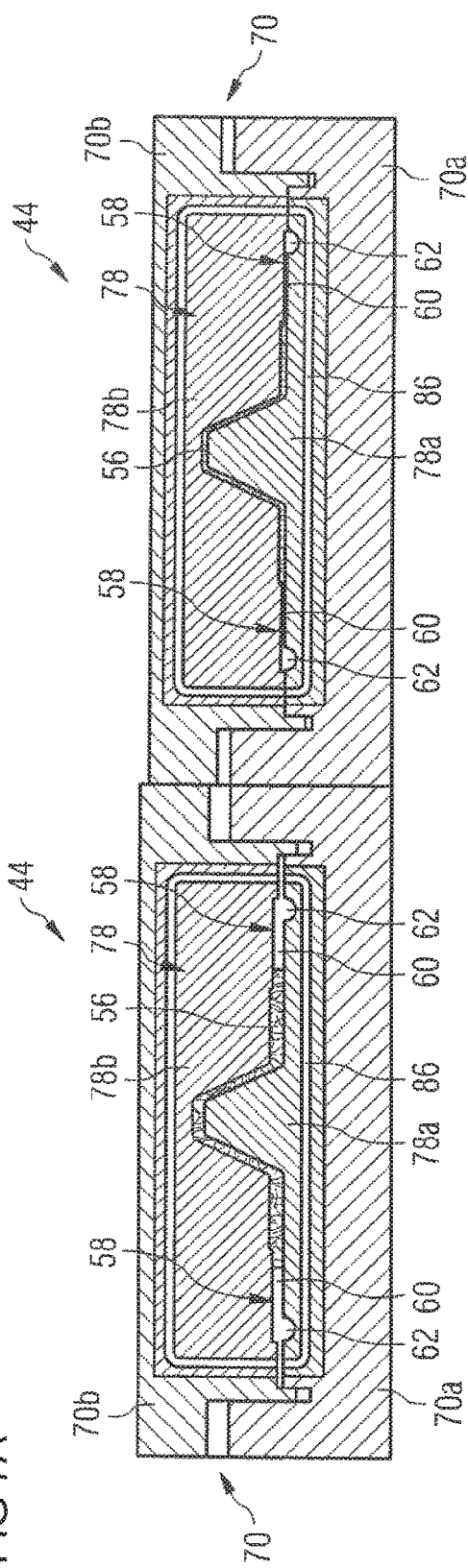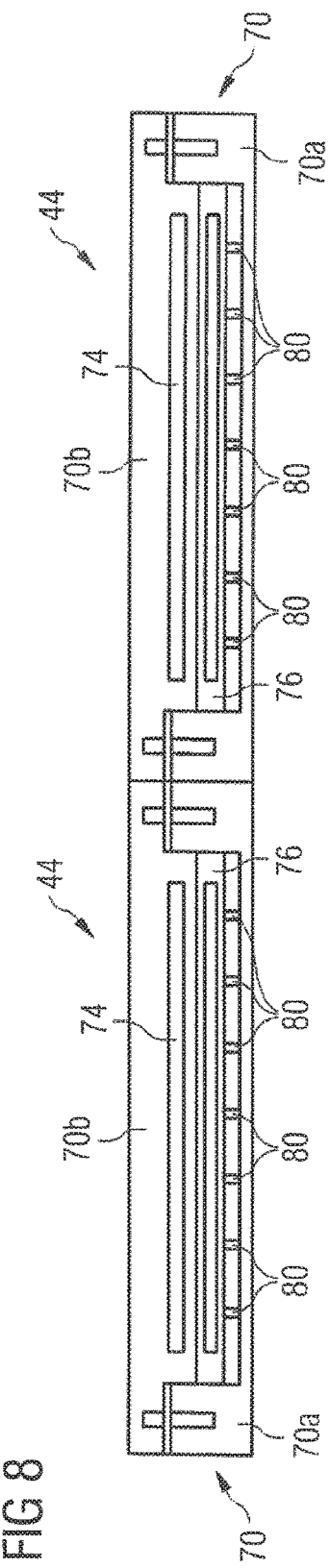

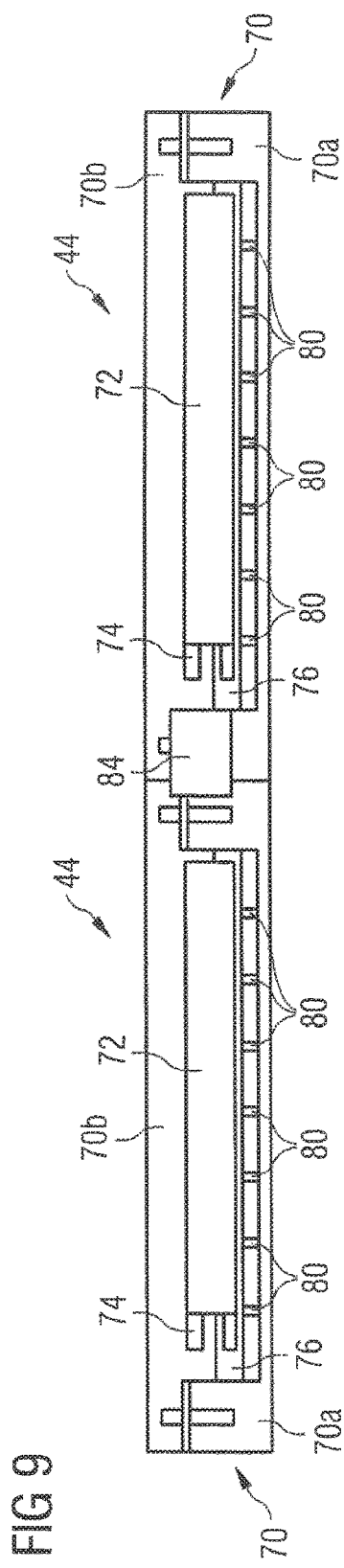

APPARATUS AND METHOD FOR CONTINUOUSLY MANUFACTURING COMPONENTS FROM FIBER-REINFORCED COMPOSITES, AND MOLD SET

CROSS-REFERENCES TO RELATED APPLICATIONS

This application is a continuation of International Application PCT/EP2014/076870 filed Dec. 8, 2014, designating the United States and published on Jun. 25, 2015 as WO 2015/091052. This application also claims the benefit of the German patent application No. 10 2013 226 753.3 filed on Dec. 19, 2013. The entire disclosures of the above are incorporated herein by way of reference.

BACKGROUND OF THE INVENTION

The invention relates to an apparatus and a method for continuously manufacturing components, in particular aircraft structural components, from fiber-reinforced composites. Furthermore, the invention relates to a mold set, which is suitable for use in an apparatus for continuously manufacturing components, in particular aircraft structural components, from fiber-reinforced composites.

In aircraft construction, efforts are being made to use components that consist entirely or partially of fiber-reinforced composites, for example carbon fiber reinforced plastics (CFRP), increasingly as load-bearing components. For example, DE 10 2007 062 111 A1 describes a cross member structure consisting of carbon fiber reinforced plastic that is used to support the individual panels of an aircraft floor system for separating a passenger cabin from a cargo hold arranged below the passenger cabin. Furthermore, it is known from DE 10 2004 001 078 A1 and CN 100418850, for example, to provide aircraft fuselage segments with a skin and reinforcing elements (e.g., ribs, stringers) of fiber-reinforced composites.

In the manufacture of aircraft structural components from fiber-reinforced composites, a multilayer laminate may first be built up from fiber prepregs. The fiber prepregs may comprise a woven fabric or mat of reinforcing fibers, which are provided with a surface layer of a curable synthetic material. The laminate construction may be carried out manually or automatically. Then the fiber prepregs may be put into a desired shape of a two-dimensional section forming an aircraft outer skin or of a reinforcing section forming a frame or stringer. Finally, the synthetic material applied to the surfaces of the fibers is cured in an autoclave cycle under pressure and/or at increased temperature, so that a composite is created with a matrix of a cured synthetic material and reinforcing fibers embedded into the matrix. An autoclave process is particularly suitable for the individual manufacture of even components of complex formation.

In contrast to this, EP 1 819 503 B1 describes a method for continuously manufacturing structural profiles suitable for use as aircraft structural components. In this method, a multilayer fiber layer structure is first produced. To do this, dry fiber layers are unwound from appropriate reels and supplied to a preforming tool, which puts the fiber layers into a desired preform under pressure. The preformed fiber layer stack produced in the preforming tool is impregnated with a mixture of an epoxy resin and a curing agent, which is caused to partially react by the supply of heat, causing an increase in the viscosity of the resin. Then the resin-impregnated fiber layer stack is heated further in a cycle press and pressurized, so that the resin gels and crosslinking proceeds up to dimensional stability. Finally, complete curing of the resin takes place in a tunnel kiln.

During the process as a whole, the fiber layers, fiber layer stack and resin-impregnated fiber layer stack are conveyed by pertinent extraction devices continuously to and through the individual stations in the process. The cycle press is supported movably so that it can be moved over a certain distance together with the resin-impregnated fiber layer stack to be pressed. As soon as the treatment of one section of the resin-impregnated fiber layer stack in the cycle press is completed, the cycle press is opened and moved opposite to the direction of movement of the resin-impregnated fiber layer stack until it has reached a corresponding position in which the cycle press can be closed again to treat a further section of the resin-impregnated fiber layer stack. The continuous process described in EP 1 819 503 B1 is suitable for the manufacture of structural profiles with a constant cross section in large numbers.

SUMMARY OF THE INVENTION

An object of the invention is to specify an apparatus and a method that facilitate a continuous manufacture of components, in particular aircraft structural components, of varying cross section from fiber-reinforced composites. Furthermore, the object of the invention is to provide a mold set suitable for use in such an apparatus.

An apparatus for continuously manufacturing components from fiber-reinforced composites comprises a conveying device, which is configured to convey a semifinished product containing reinforcing fibers through the apparatus. The reinforcing fibers contained in the semifinished product may be present in the form of single fibers or in the form of a fiber mat or fiber woven fabric. In particular, the semifinished product may be in the form of an endless strand and consequently be suitable for being processed further into elongated structural profiles, for example, as a primary structural component in frames, stringers or the like that may be used in an aircraft. The operation of the conveying device may be controlled in such a way that the semifinished product is conveyed continuously at a constant or varying speed through the apparatus. However, it is also conceivable to control the operation of the conveying device in such a way that the semifinished product is conveyed through the apparatus stepwise and/or with conveying intervals between individual stations of the apparatus.

Furthermore, the apparatus for continuously manufacturing components from fiber-reinforced composites comprises a forming device, which is configured to bring the semifinished product into a desired form. The forming device comprises a press with a first pressing element and a second pressing element arranged opposite the first pressing element. The pressing elements of the press may be designed in the form of press plates. Alternatively to this, however, the press may be designed in the form of a belt press, the pressing elements of which are formed by conveyor belts arranged opposite one another. It is only essential that the press is suitable for pressurizing the semifinished product conveyed by the conveying device through the apparatus and bringing it into a desired form in this way. Both pressing elements may be movable relative to one another to pressurize the semifinished product. It is also conceivable, however, to use a press in the apparatus that comprises a rigidly fixed pressing element and a pressing element that is movable relative to the rigidly fixed pressing element. Furthermore, depending on the geometry of the component to be produced, a press that presses on all sides with a fixed pressing jaw and three movable pressing jaws may be used.

The forming device comprises a plurality of differently shaped molds that are pressurizable by the press. The molds may comprise metal, for example, but also an elastomer material, or may contain a metal or elastomer material. Furthermore, the forming device comprises a mold application station, arranged upstream of the press relative to the conveying direction of the semifinished product through the apparatus, for applying a mold to a section of the semifinished product, and a mold release station, arranged downstream of the press relative to the conveying direction of the semifinished product through the apparatus, for releasing the mold from the section of the semifinished product. "Differently shaped molds" are taken here to mean molds with different geometries, wherein the different mold geometries correspond to different desired geometries of individual sections of the semifinished product. If a mold is pressurized by the press, a section of the semifinished product taken up in the mold is also pressurized and is formed in this way according to the geometry of the mold.

In the apparatus for continuously manufacturing components from fiber-reinforced composites, a forming device is consequently used in which the semifinished product may be formed differently in sections by the differently shaped molds. A continuous manufacture of components from fiber-reinforced composites is facilitated by this, which components have a shape that varies section-wise, in particular a cross section that varies section-wise. Thus even components of a complex shape, in particular aircraft structural components of varying cross section, can be manufactured cost-effectively in large numbers and low production times. In particular, elongated stiffening elements, which contain ramps, offsets, locally limited projections etc., are accessible to a continuous manufacturing process.

In a preferred embodiment, the apparatus for continuously manufacturing components from fiber-reinforced composites comprises a control device that is configured to control the operation of the conveying device and the forming device in such a way that the pressing elements of the press are operated into a closed position, in order to pressurize a first mold, which is applied to a first section of the semifinished product, and the pressing elements are moved together with the first section of the semifinished product and the first mold in the conveying direction of the semifinished product, as long as the pressing elements are pressurizing the first mold. In other words, the pressing elements are preferably moved at the same speed as the first section of the semifinished product and the first mold in the conveying direction of the semifinished product as long as the pressing elements are pressurizing the first mold. In order to achieve this, the pressing elements of the press may be movable, for example, along a suitable guide device parallel to the first section of the semifinished product and the first mold.

Furthermore, the control device may be configured to control the operation of the conveying device and the forming device in such a way that the pressing elements are operated into an open position and moved relative to the first section of the semifinished product and the first mold opposite to the conveying direction of the semifinished product, until the pressing elements are arranged in a position in which they can once again be operated into a closed position in order to pressurize a second mold, which is applied to a second section of the semifinished product arranged behind the first section of the semifinished product relative to the conveying direction of the semifinished product through the apparatus. In other words, following the end of the pressurization of the first section of the semifinished product, the pressing elements may be moved opposite to the conveying direction of the semifinished product relative to the semifinished product until they can once again be operated into their closed position and thus pressurize the second section of the semifinished product via the second mold.

Apart from reinforcing fibers, the semifinished product supplied to the forming device preferably comprises a synthetic material, which forms a matrix in the finished component in which the reinforcing fibers are embedded. The synthetic material may be a thermoplastic synthetic material, for example, or a curable synthetic material. For example, the semifinished product may contain a curable resin material, in particular an epoxy resin. In particular, if the semifinished product contains a curable synthetic material, thus a resin, for example, the press may comprise a heating device, which makes it possible to heat the semifinished product during the pressing process. The operation of the heating device may be controlled by the control device in such a way that a curable synthetic material contained in the semifinished product cures completely or partially while the semifinished product is pressurized in the press.

The pressing elements of the press and the molds may be dimensioned such that a plurality of molds, which are applied to sections of the semifinished product arranged behind one another relative to the conveying direction of the semifinished product through the apparatus, are pressurizable simultaneously by the press. Several molds and consequently several sections of the semifinished product arranged behind one another can then be pressurized by one pressing cycle of the press.

In a preferred embodiment of the apparatus, the molds have the same dimensions along the conveying direction of the semifinished product. The control device may be configured to control the operation of the conveying device and the forming device in such a way that the pressing elements are moved in their closed position over a distance together with the first section of the semifinished product and the first mold in the conveying direction of the semifinished product, which distance substantially corresponds to the dimension of the molds along the conveying direction of the semifinished product. Following the movement into their open position, the pressing elements may then be moved, under the control of the control device, a distance opposite to the conveying direction of the semifinished product, which distance likewise corresponds substantially to the dimension of the molds along the conveying direction of the semifinished product.

In such a control of the operation of the conveying device and the forming device, the first mold can be released, following pressurization in the press of the forming device, from the first section of the semifinished product in the mold release station. At the same time, the second mold, which is applied to the second section of the semifinished product arranged downstream of the first section of the semifinished product relative to the conveying direction of the semifinished product through the apparatus, can be pressurized in the press of the forming device. Furthermore, a third mold can be applied in the mold application station to a third section of the semifinished product arranged downstream of the second section of the semifinished product relative to the conveying direction of the semifinished product through the apparatus. Alternatively to this, however, it is also conceivable to use molds of a length greater than the length of the pressing elements and to pressurize only a partial area of the molds in each pressing cycle. Finally, molds in which the various tool parts are of different lengths may also be used.

Even if the pressing elements and the molds are dimensioned such that a plurality of molds are pressurizable simultaneously in the press, the operation of the conveying device and the forming device may be controlled by the control device in such a way that the pressing elements are moved in the conveying direction or opposite to the conveying direction of the semifinished product in each case only by a distance that substantially corresponds to the dimension of a mold. The molds arranged between the pressing elements of the press can then be subjected to several pressing cycles, wherein the number of pressing cycles corresponds to the number of molds that can be arranged simultaneously between the pressing elements of the press. It is clear that the operational control of the conveying device and the forming device may also be adapted accordingly in order to control as desired the number of pressing cycles to which the molds arranged between the pressing elements of the press, and thus the semifinished product sections taken up in the molds, are subjected.

At least a part of the molds may comprise at least one connecting element, which is configured to connect several molds to one another, which molds are applied to sections of the semifinished product arranged behind one another relative to the conveying direction of the semifinished product through the apparatus. It can be prevented thereby that the molds shift relative to the semifinished product and/or relative to one another, in particular if a part of the molds or all molds are pressurized in the press.

The apparatus for continuously manufacturing components from fiber-reinforced composites may comprise a supply device that is configured to provide the semifinished product containing reinforcing fibers. The supply device preferably comprises at least one reel rotatable about an axis of rotation, onto which a semifinished product, for example in the form of an endless strand, is wound. The semifinished product is preferably a dry semifinished product, the reinforcing fibers of which are not impregnated with a synthetic material. If desired, however, the supply device may also be configured to provide a semifinished product with reinforcing fibers that are already impregnated with a synthetic material. Apart from reinforcing fibers, the semifinished product may comprise other components influencing the material properties, such as e.g., binding threads, impact strength modifiers, binder particles or general functional elements such as e.g., electrical or optical cables.

In a particularly preferred embodiment, the supply device comprises a plurality of reels, onto each of which a semifinished product is wound, which may be provided in the form of an endless strand. Then several layers of semifinished products can be unwound from the individual reels simultaneously and brought together to form a stack of several layers of semifinished products. The reinforcing fibers may be oriented unidirectionally, bidirectionally or in any way in the individual semifinished products. Furthermore, semifinished products with various fiber orientations may be stacked on top of one another, in order to control the mechanical properties of the component to be manufactured from the semifinished product in a targeted manner. Alternatively to this, however, it is conceivable to use a supply device in the apparatus in which individual layers of semifinished products are first cut into a desired shape and then supplied individually to a stacking device. The desired stack of semifinished product layers can then be produced from the individual layers in the stacking device.

The reels of the supply device may comprise an alignment device to align the reels along their axes of rotation. The alignment device may comprise a detection device in the form of a light barrier or the like, for example, which preferably detects continuously a position on the reel of the semifinished product, which is wound on the reel and contains reinforcing fibers. Depending on the results of measurement provided by the detection device, a suitable control device can then ensure a movement of the position of the reels along their axis of rotation, so that the layers of semifinished product unwound from the reels can be arranged precisely above one another when unwound from the reels. The reels may be moved along their axis of rotation by an electric motor and a spindle drive, for example. The formation of folds in the individual layers of semifinished product can be prevented or at least significantly reduced by such a configuration of the supply device.

The supply device may also comprise a guide and/or smoothing device comprising reels or slide shoes, which device guides and smooths the layers of semifinished product unwound from the individual reels of the supply device when they are stacked on top of one another. If desired, a heating device may also be provided, which is used to activate a binder contained in the layers of semifinished product, for example a thermoplastic binder, in order to join the layers of semifinished product stacked on top of one another together. The heating device may comprise a heat source formed as an infrared radiator, for example, or another suitable heat source.

Furthermore, the apparatus for continuously manufacturing components from fiber-reinforced composites may comprise a preforming device for preforming of the semifinished product supplied by the supply device. Equipping of the apparatus with a preforming device suggests itself, in particular, if several layers of semifinished products are supplied by the supply device, which layers are joined to one another to form a stack of semifinished product layers. The preforming device may comprise a preforming tool with a cavity, for example, the shape of which corresponds to the desired shape of the semifinished product or of the stack of semifinished product layers. In a preferred embodiment, the preforming device comprises a preforming tool through which the semifinished product to be preformed can be guided continuously. A cavity formed in the preforming tool may then have a varying cross section along the conveying direction of the fiber woven fabric through the preforming tool. In particular, the cavity may have a substantially flat cross section adapted to the shape of the semifinished product or of the stack of semifinished product layers in the area of an inlet of the preforming tool, whereas the cavity may have a shape in the area of an outlet of the preforming tool that is already approximated to the desired shape of the component to be manufactured.

As already mentioned, the supply device may supply a semifinished product already impregnated with a synthetic material, in particular a fiber prepreg. However, dry semifinished products can be obtained much more cheaply than prepregs. In particular, if a dry semifinished product is supplied by the supply device, the apparatus therefore preferably also comprises an impregnation device for impregnating the semifinished product with a synthetic material. The impregnation device may comprise an impregnating bath, through which the semifinished product or semifinished product stack is drawn. Alternatively, or in addition, the impregnation device may also comprise an impregnating mold, into which the synthetic material may be injected at a certain pressure. A cavity may be formed in the impregnating mold, the shape of which may already substantially correspond to the desired shape of the component to be manufactured.

Furthermore, a preheating device may also be provided in the apparatus for the continuous manufacture of components from fiber-reinforced composites for preheating the semifinished product impregnated with a synthetic material. The operation of the preheating device is preferably controlled in such a way that the viscosity of an impregnating material consisting of a curable synthetic material is increased, but no substantial crosslinking reactions take place yet in the curable synthetic material. The preheating device may comprise a convection tunnel kiln, an apparatus for irradiating the semifinished product impregnated with a synthetic material with electron beams or an infrared radiator, for example.

The apparatus may also comprise a mold handling device. The mold handling device may be configured to take up molds from the forming device, which are released from the semifinished product in the mold release station, and process them for re-use. Processing of the molds may comprise the cleaning of the molds and the treatment of the molds with a release aid, in particular the insertion of a release film into the molds. A release aid and/or release film makes easier the release from the mold of a semifinished product brought into a desired shape in the mold. Furthermore, the mold handling device may comprise a mold storage facility, in which molds that are not to be directly reused in the forming device can be stored. In a preferred embodiment, the mold handling device comprises a robot, which receives the molds from the forming device, processes them and transfers them if necessary to the mold storage facility. The robot may also transfer molds to the forming device, i.e., in particular to the mold application station of the forming device, wherein the molds can also be removed if necessary from the mold storage facility for this purpose. Moreover, the mold handling device may comprise a device for preheating the molds.

Furthermore, the apparatus may comprise a curing device for curing a curable synthetic material contained in the semifinished product formed by the forming device. The curing device may comprise, for example, a tunnel kiln, an infrared radiator, an inductively operating heating apparatus or a microwave heating apparatus. The operation of the curing device, i.e., the operation of a heating device of the curing device, is preferably controlled in such a way that a curable synthetic material contained in the semifinished product is cured completely by the supply of heat of the heating device. If desired, however, only a partial curing of a curable synthetic material contained in the semifinished product formed by the forming device may take place in the curing device.

Finally, the apparatus may comprise a cutting device for cutting the semifinished product, which is formed by the forming device and cured if necessary, into the desired shape, i.e., to a desired length. The cutting device may comprise a belt saw, for example, which is supported movably, so that it can be moved together with the semifinished product to be cut in the conveying direction of the semifinished product through the apparatus, in order to produce a cut running perpendicular to the conveying direction. Furthermore, the cutting device may comprise a guide and/or holding device, which may be arranged downstream or upstream of the saw relative to the conveying direction of the semifinished product through the apparatus and may be used to avoid undesirable movements of the semifinished product or vibrations in the semifinished product. The position of the guide and/or holding device may be controlled by means of a control device as a function of the varying shape of the semifinished product to be cut.

The conveying device may comprise a first and a second clamping device. The first and the second clamping device may be adjustable respectively between an open position, in which they release the semifinished product, and a closed position, in which they clamp the semifinished product between two clamping jaws, and may be movable in the conveying direction or opposite to the conveying direction of the semifinished product between a clamping position and a release position. The control device may be configured to control the operation of the first and the second clamping device in such a way that the first clamping device is in its open position and is moved opposite to the conveying direction of the semifinished product relative to the semifinished product from its release position to its clamping position, if the second clamping device is in its closed position and is moved in the conveying direction of the semifinished product together with the semifinished product from its clamping position to its release position. Conversely the first clamping device may be in its closed position and be moved in the conveying direction of the semifinished product together with the semifinished product from its clamping position to its release position, if the second clamping device is in its open position and is moved opposite to the conveying direction of the semifinished product relative to the semifinished product from its release position to its clamping position. In a conveying device formed in such a way, the first and the second clamping device consequently alternately provide for a movement of the semifinished product in the conveying direction.

Alternatively, or in addition to this, the conveying device may also comprise two conveyor belts arranged opposite one another, which are configured to exert such a clamping force on a section of the semifinished product arranged between the conveyor belts that the semifinished product is moved by the conveying movement of the conveyor belts in its conveying direction. If desired, the conveyor belts may be formed such that they are only in contact with the semifinished product in a locally limited manner. Damage to sensitive areas of the semifinished product in particular caused by the conveyor belts is avoided by this. Furthermore, at least one of the conveyor belts may be supported elastically, in order to take account of variations in the profile thickness of the semifinished product.

The conveying device may be formed integral with the forming device of the apparatus for the continuous manufacture of components from fiber-reinforced composites. For example, the press of the forming device may form the first clamping device of the conveying device, downstream or upstream of which a second clamping device described above may be located. The press forming the first clamping device and the second clamping device may then be operated as described above to convey the semifinished product through the apparatus. If desired, a conveying device comprising two conveyor belts arranged opposite one another may also be formed integral with the forming device. The two conveyor belts arranged opposite one another of the conveying device then form the press of the forming device. Furthermore, a press that presses on all sides with one fixed pressing jaw and three movable pressing jaws may be used.

In a method for continuously manufacturing components from fiber-reinforced composites, a semifinished product containing reinforcing fibers is conveyed by a conveying device. The semifinished product is formed by a forming device, which comprises a press with a first pressing element and a second pressing element arranged opposite the first pressing element. In a mold application station of the forming device arranged upstream of the press relative to the conveying direction of the semifinished product, differently shaped molds, which are pressurizable by the press, are applied to respective sections of the semifinished product. In a mold release station arranged downstream of the press relative to the conveying direction of the semifinished product, these differently shaped molds that are pressurizable by the press are released again from the respective sections of the semifinished product.

The operation of the conveying device and of the forming device is preferably controlled by a control device in such a way that the pressing elements of the press are operated into a closed position, in order to pressurize a first mold, which is applied to a first section of the semifinished product. The pressing elements may be moved together with the first section of the semifinished product and the first mold in the conveying direction of the semifinished product as long as the pressing elements pressurize the first mold. Furthermore, the pressing elements may be operated by the control device into an open position and moved opposite to the conveying direction of the semifinished product relative to the first section of the semifinished product and the first mold until the pressing elements are arranged in a position in which they can be operated once again into a closed position, in order to pressurize a second mold, which is applied to a second section of the semifinished product arranged downstream of the first section of the semifinished product relative to the conveying direction of the semifinished product through the apparatus.

A plurality of molds, which are applied to sections of the semifinished product arranged behind one another relative to the conveying direction of the semifinished product, are preferably pressurized simultaneously by the press.

The molds may have the same dimensions along the conveying direction of the semifinished product. The control device may control the operation of the conveying device and the forming device then in such a way that the pressing elements are moved in their closed position over a distance together with the first section of the semifinished product and the first mold in the conveying direction of the semifinished product, which distance substantially corresponds to the dimension of the molds along the conveying direction of the semifinished product. Furthermore, following the movement into their open position, the pressing elements may be moved under the control of the control device by a distance opposite to the conveying direction of the semifinished product, which distance likewise substantially corresponds to the dimension of the molds along the conveying direction of the semifinished product. Alternatively to this, however, it is also conceivable to use molds of a length greater than the length of the pressing elements and to only pressurize a partial area of the molds in each pressing cycle.

In a preferred embodiment of the method, several molds, which are applied to sections of the semifinished product arranged behind one another relative to the conveying direction of the semifinished product, are connected to one another by at least one connecting element before they are pressurized by the press. The connection between the molds is preferably released again following pressurization of the molds in the press. The molds may be demolded immediately following the pressurization. Alternatively to this, however, the molds may also only be demolded following a complete curing of a synthetic material contained in the semifinished products.

In the method for continuously manufacturing of components from fiber-reinforced composites, a semifinished product containing reinforcing fibers may be supplied by a supply device, which comprises at least one reel, onto which the semifinished product containing the reinforcing fibers is wound. The semifinished product containing the reinforcing fibers may be preformed by a preforming device. The semifinished product containing reinforcing fibers may be impregnated with a synthetic material by an impregnating device. The semifinished product containing reinforcing fibers impregnated with a synthetic material may be preheated by a preheating device. Molds may be taken up from the forming device and processed by a mold handling device. Furthermore, the mold handling device may deliver molds to the forming device. A curable synthetic material, which is contained in the semifinished product formed by the forming device, may be completely or partially cured by a curing device. Finally, the semifinished product formed by the forming device may be cut to a desired shape by a cutting device.

The conveying device may comprise a first and a second clamping device, which are each adjustable between an open position, in which they release the semifinished product, and a closed position, in which they clamp the semifinished product between two clamping jaws, and may be movable in the conveying direction or opposite to the conveying direction of the semifinished product between a clamping position and a release position. The control device may control the operation of the first and the second clamping device in such a way that the first clamping device is in its open position and is moved opposite to the conveying direction of the semifinished product relative to the semifinished product from its release position to its clamping position, if the second clamping device is in its closed position and is moved in the conveying direction of the semifinished product together with the semifinished product from its clamping position to its release position. Conversely the first clamping device may be in its closed position and be moved in the conveying direction of the semifinished product together with the semifinished product from its clamping position to its release position, if the second clamping device is in its open position and is moved opposite to the conveying direction of the semifinished product relative to the semifinished product from its release position to its clamping position.

Alternatively, or in addition to this, the conveying device may also comprise two conveyor belts arranged opposite one another, which exert such a clamping force on a section of the semifinished product arranged between the conveyor belts that the semifinished product is moved by the conveying movement of the conveyor belts in its conveying direction. At least one of the conveyor belts may be supported elastically. The conveying device may be formed integral with the forming device.

At least a part of the differently formed molds of the forming device may comprise a first mold section and a second mold section arranged opposite the first mold section, so that in the mold application station of the forming device the two mold sections may be applied to surfaces of the semifinished product arranged opposite one another. The two mold sections may be connectable to one another by a corresponding connecting device. For example, the connecting device may be configured to engage in grooves that are provided on side walls of the first and the second mold section.

Furthermore, at least a part of the molds may comprise a receiving space provided in the interior space of the molds for receiving surplus synthetic material, which may be pressed out of the semifinished product upon pressurization of the semifinished product in the press of the forming device. The receiving space may comprise a first section, which is positioned such that it adjoins an edge of a semifinished product taken up in the mold. Furthermore, the receiving space may comprise a groove section adjoining the first section for receiving larger quantities of synthetic material. Undesirable accumulations of synthetic material in the semifinished product or at the edges of the semifinished product can thereby be avoided. The receiving space may also serve as a receiving space for an air/synthetic material mixture and consequently for ventilation of the component. A pore-free component is obtained by this.

A mold set for use in a forming device of an apparatus for continuously manufacturing components from fiber-reinforced composites comprises a standardized support element, which is pressurizable by a press of the forming device. The mold set also comprises a plurality of differently shaped inserts that are detachably connectable to the support element. "Differently shaped inserts" are understood here to mean inserts with different geometries, wherein the different insert geometries correspond to different desired geometries of individual sections of the semifinished product. If a mold that comprises a standardized support element and an insert detachably connectable to the support element is pressurized by the press of the forming device, a section of the semifinished product taken up in the mold is also pressurized and is formed in this way according to the geometry of the insert.

In an apparatus for continuously manufacturing components from fiber-reinforced composites, the forming device of which is equipped with such a mold set, it is sufficient for the manufacture of components with a shape that varies section-wise to provide only differently shaped inserts. The inserts may be inserted into the standardized support element in a mold handling device of the apparatus, for example. Due to this, a plurality of differently shaped complete molds no longer has to be manufactured, held and stored, due to which cost and storage capacity can be saved. The mold set is therefore especially suitable for use in a forming device described above of an apparatus for the continuous manufacture of components from fiber-reinforced composites. A plurality of mold sets is preferably held in the forming device of the apparatus for the continuous manufacture of components from fiber-reinforced composites.

The standardized support element of the mold set may comprise a first partial section and second partial section. If a mold that has a standardized support element is pressurized by a press of the forming device, the partial sections of the support element preferably are arranged opposite one another. The first and second partial section may be connectable to one another by a connecting device. The partial sections of the support element can then be applied to surfaces of the semifinished product arranged opposite one another in a mold application station of the forming device and then connected to one another. The connecting device may be configured, for example, to engage in grooves that are provided in side walls of the first and the second partial section of the support element.

Furthermore, at least a part of the inserts that are detachably connectable to a standardized support element may comprise a first insert section and a second insert section. If a mold that has a standardized support element and an insert detachably connected to the support element is pressurized by a press of the forming device, the insert sections of the inserts preferably are arranged opposite one another. The insert sections may be laid in corresponding partial sections of the support element. At least one of the two insert sections is preferably supported elastically in the support element or the corresponding support element partial section. For example, an insert section may be supported on a spring element or on a plurality of spring elements, which is/are supported on an inner surface of the support element or the support element partial section facing the insert section. While the mold is not pressurized, the two insert sections are kept at a desired distance from one another by the spring force of the spring element/spring elements, which distance may correspond to a suitable profile thickness of the semifinished product taken up in the insert before the molding step. If the mold is pressurized in a press of the forming device, on the other hand, the insert sections are moved towards one another against the spring force of the spring element/spring elements, so that the distance between the two insert sections is reduced. The profile thickness of the semifinished product taken up in the insert is thereby reduced by a desired amount and the semifinished product thus brought into the desired shape.

As explained above, an apparatus for the continuous manufacture of components from fiber-reinforced composites may comprise a separately guided impregnating device for the impregnation of a semifinished product, which contains reinforcing fibers and is supplied to the apparatus, with a synthetic material, wherein the impregnating device may comprise a separate impregnating tool formed for example in the form of an impregnating bath or an injection tool. Alternatively to this, however, it is also conceivable to integrate the impregnating device into the forming device. To bring this about, an injection duct for injecting a synthetic material into an interior space of the mold may be provided in a mold that has a standardized support element and an insert detachably connected to the support element. The synthetic material can then be injected directly into the mold and consequently into the semifinished product taken up in the mold before the mold is pressurized in the press of the forming device. A separate impregnating tool can then be dispensed with.

Furthermore, a mold that has a standardized support element and an insert detachably connected to the support element may comprise a receiving space provided in the interior space of the mold for receiving surplus synthetic material, which may be pressed out of the semifinished product upon the injection of synthetic material into the mold and a semifinished product taken up in the mold and/or upon pressurization of the semifinished product in a press of the forming device. The receiving space may comprise a first section, which is positioned such that it adjoins an edge of a semifinished product taken up in the mold. Furthermore, the receiving space may comprise a groove section adjoining the first section for receiving larger quantities of synthetic material. Undesirable accumulations of synthetic material in the semifinished product or at the edges of the semifinished product can thereby be avoided.

BRIEF DESCRIPTION OF THE DRAWINGS

Preferred embodiments of the invention are now explained in greater detail with reference to the enclosed schematic drawings, in which FIGS. 7A and 7B show the mold according to FIG. 6A in a cross-sectional representation in an unloaded state as well as upon pressurization by a press of a forming device of an apparatus for continuously manufacturing components from fiber-reinforced composites, FIG. 8 shows two molds according to FIG. 6A arranged behind one another in a side view, FIG. 9 shows the molds according to FIG. 8, but wherein partial sections of the support element of the respective molds as well as the two molds arranged behind one another are connected to one another by suitable connection devices.

DETAILED DESCRIPTION OF THE PREFERRED EMBODIMENTS

Figure 1:
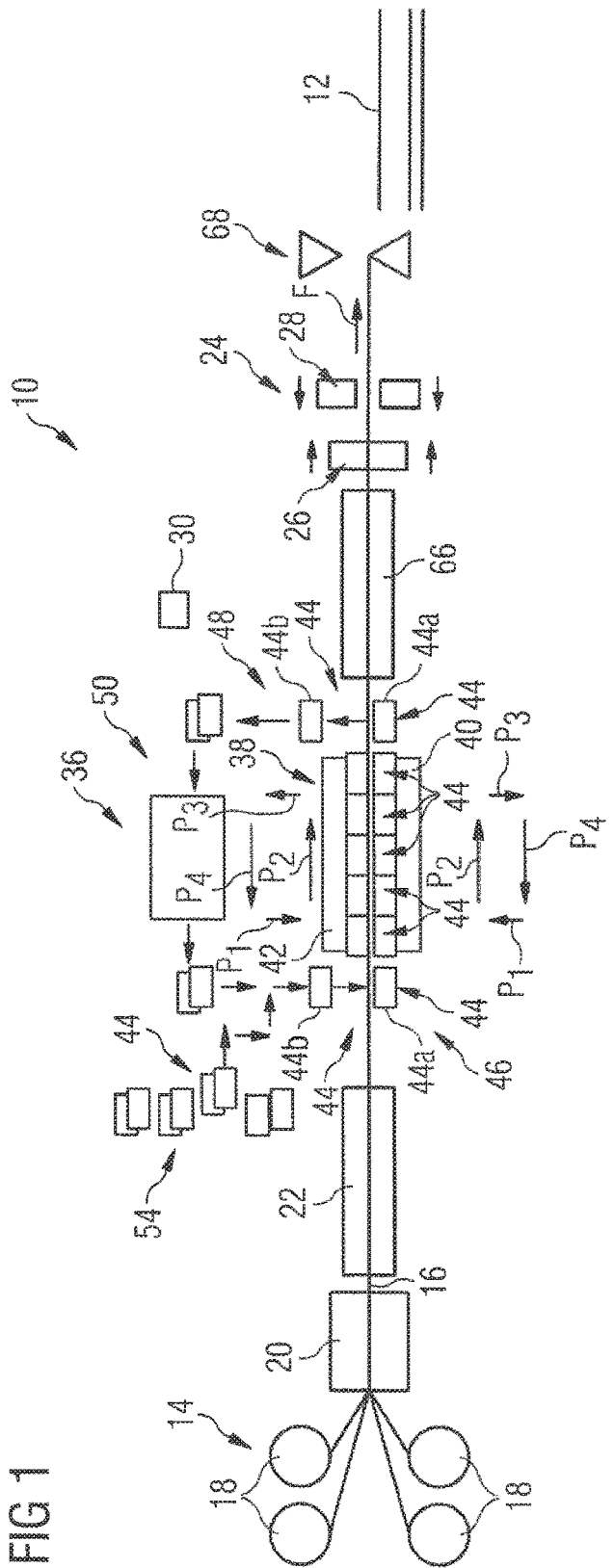
FIG. 1 shows an overview representation of an apparatus for continuously manufacturing of components from fiber-reinforced composites.

FIG. 1 shows an apparatus 10 for continuously manufacturing components 12 from fiber-reinforced composites. The apparatus 10 comprises a supply device 14 for the supply of a semifinished product 16 containing reinforcing fibers. In particular, the supply device 14 comprises a plurality of reels 18, onto which a semifinished product that is in the form of an endless strand and contains reinforcing fibers is wound. The semifinished product containing reinforcing fibers is a dry semifinished product containing reinforcing fibers, the reinforcing fibers of which are not impregnated with a synthetic material. The semifinished products containing reinforcing fibers and wound onto the individual reels 18 may differ from one another in respect of the nature and orientation of the reinforcing fibers contained in the woven fabric.

The layers of semifinished product unwound from the reels 18 are stacked above one another in a sequence that depends, for example, on the desired mechanical properties of the component 12 to be manufactured. The semifinished product stack is then supplied to a preforming device 20. The preforming device 20 comprises a preforming tool, which is not illustrated in greater detail in FIG. 1, in which a cavity is formed, through which the semifinished product stack can be guided. The cavity has a varying cross section along a conveying direction F of the semifinished product stack through the preforming device 20. In particular, the cavity has a flat cross section substantially corresponding to the shape of the semifinished product stack in the area of an inlet of the preforming tool. In the area of an outlet, the cavity formed in the preforming tool has a cross section, on the other hand, that is already approximated to a cross section of a component 12 to be manufactured from the semifinished product 16.

After passing the preforming device 20, the semifinished product 16 is supplied to an impregnating device 22. In the impregnating device 22, the reinforcing fibers of the semifinished product are impregnated with a synthetic material, in particular a curable synthetic material, such as, e.g., a resin. The impregnating device 22 may comprise an impregnating bath, through which the semifinished product stack is drawn. Alternatively to this, however, the impregnating device 22 may also comprise an impregnating mold, into which the synthetic material may be injected at a certain pressure. If an impregnating mold is used in the impregnating device 22, the impregnating mold is preferably provided with a cavity, the shape of which already substantially corresponds to the desired shape of a component 12 to be manufactured.

If desired, the impregnating mold may be cooled in the area of a mold inlet. An inlet area of the mold may thereby be closed by increasing the viscosity of a synthetic material that is viscous at room temperature despite of a continuous infeed. As a result, impregnation under pressure is facilitated. At an outlet of the mold, a closure of the outlet may be attained by an exact temperature control and a crosslinking reaction initiated thereby up to the gel phase. Due to this, highly reactive resins can be used and a qualitatively high saturation of the semifinished product with special materials containing, e.g., impact strength modifiers, which normally have a low permeability can be achieved.

The semifinished product 16 is conveyed through the apparatus 10 by a conveying device 24. The conveying device 24, which is illustrated in greater detail in FIG. 12, comprises a first and a second clamping device 26, 28, which are respectively adjustable between an open position, in which they release the semifinished product 16, and a closed position, in which they clamp the semifinished product 16 between two clamping jaws 26a, 26b, 28a, 28b. Furthermore, the clamping devices 26, 28, as indicated by the arrows PK1, PK2 in FIG. 12, are movable in a conveying direction F of the semifinished product 16 or opposite to the conveying direction F of the semifinished product 16 through the apparatus 10 between a clamping position and a release position.

The operation of the conveying device 24 is, like the operation of the other components of the apparatus 10, controlled by a central electronic control device 30. Alternatively to the central control device 30, however, several separate control devices may be used. The control device 30 controls the operation of the two clamping devices 26, 28 in such a way that the first clamping device 26 is in its open position and is moved opposite to the conveying direction of the semifinished product 16 relative to the semifinished product 16 from its release position to its clamping position, if the second clamping device 28 is in its closed position and is moved in the conveying direction F of the semifinished product 16 together with the semifinished product 16 from its clamping position to its release position.

Conversely the first clamping device 26 is in its closed position and is moved in the conveying direction F of the semifinished product 16 together with the semifinished product 16 from its clamping position to its release position, if the second clamping device 28 is in its open position and is moved opposite to the conveying direction F of the semifinished product 16 relative to the semifinished product 16 from its release position to its clamping position. This opposed operation of the two clamping devices 26, 28 is also illustrated in the schematic diagram in FIG. 12.

Figure 12:
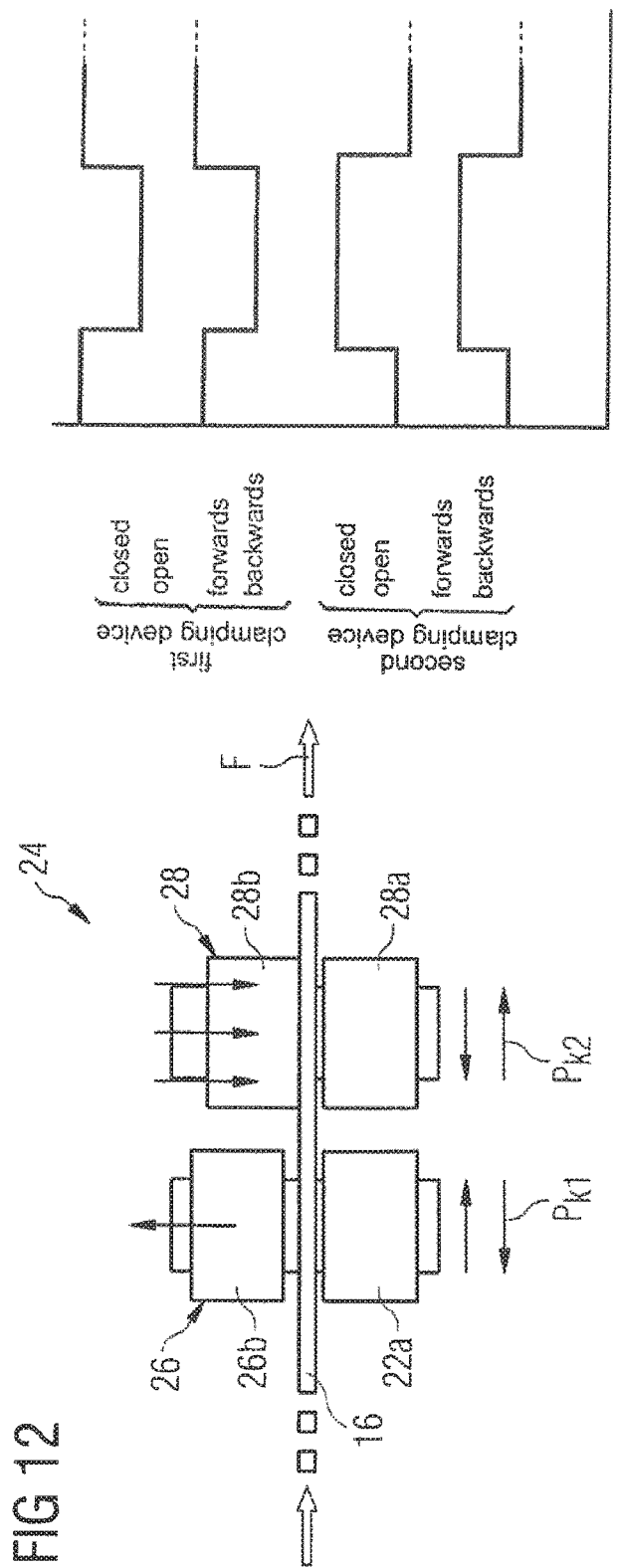
FIG. 12 shows a first variant of a conveying device, which can be used in an apparatus for continuously manufacturing components from fiber-reinforced composites according to FIGS. 1 and 10.
Figure 13:
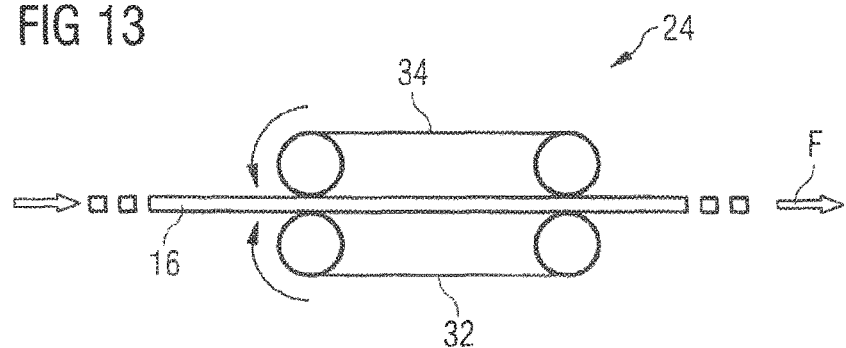
FIG. 13 shows an alternative variant of a conveying device, which can be used in an apparatus for continuously manufacturing components from fiber-reinforced composites according to FIGS. 1 and 10.

Alternatively to the variant of a conveying device 24 illustrated in FIG. 12, the conveying device 24 may also, as shown in FIG. 13, comprise two conveyor belts 32, 34 arranged opposite one another. The conveyor belts 32, 34 are movable in opposite directions and exert such a clamping force on a section of the semifinished product 16 arranged between the conveyor belts 32, 34 that the semifinished product 16 is moved by the conveying movement of the conveyor belts 32, 34 in its conveying direction F. At least one of the conveyor belts 32, 34 is then preferably elastically supported, in order to even out variations in the thickness of the semifinished product 16 to be conveyed through the apparatus 10 by the conveying device 24.

Figure 2:
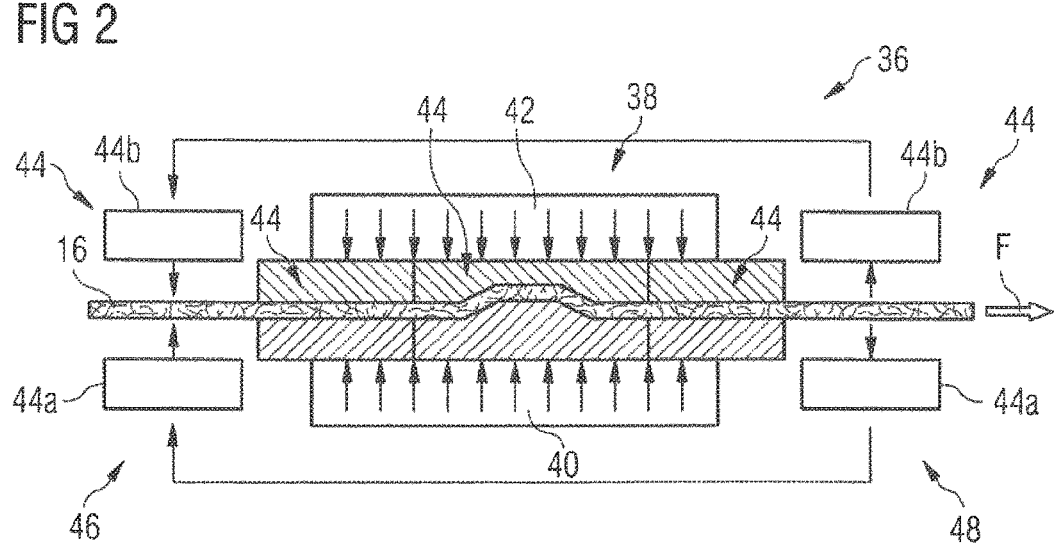
FIG. 2 shows a detailed representation of a forming device that can be used in the apparatus according to FIG. 1.

The semifinished product 16 impregnated in the impregnating device 22 with a curable synthetic material is supplied by the conveying device 24 to a forming device 36. The forming device 36 comprises a press 38 illustrated in detail in FIG. 2, which comprises a first pressing element 40 and a second pressing element 42 arranged opposite the first pressing element 40. In the press 38 illustrated in FIG. 2, the pressing elements 40, 42 are each designed in the form of press plates. Alternatively to this, however, the press 38 may also be designed in the form of a belt press with two conveyor belts arranged opposite one another. The press may then fulfil the double function of pressurizing the semifinished product 16 supplied to the press 38 on the one hand and of conveying the semifinished product 16 through the apparatus 10 on the other hand.

As well as the press 38, the forming device 36 comprises a plurality of differently shaped molds 44 that can be pressurized by the press 38. Each of the molds 44 has a first mold section 44a and a second mold section 44b. In a tool application station 46 of the forming device 36, the mold sections 44a, 44b are applied to surfaces arranged opposite one another, i.e., on an underside and an upper side of the semifinished product 16 and thus take up between them a section of the semifinished product 16.

Figure 3:
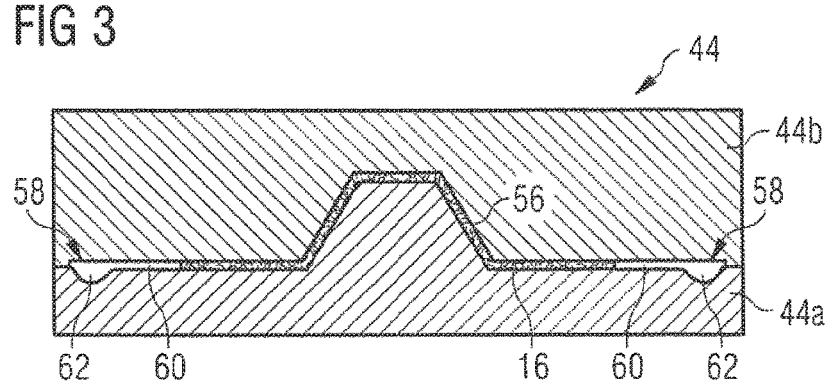
FIG. 3 shows a first variant of a mold used in the forming device according to FIG. 2 in a cross-sectional representation.
Figure 4:
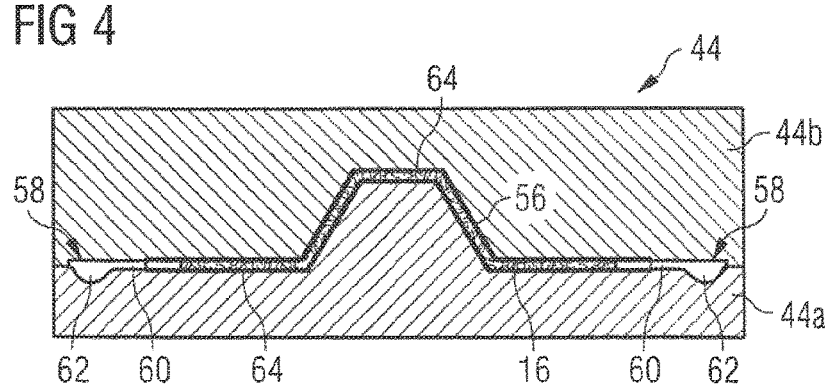
FIG. 4 shows an alternative variant of a mold used in a forming device according to FIG. 2 in a cross-sectional representation.
Figure 5A:
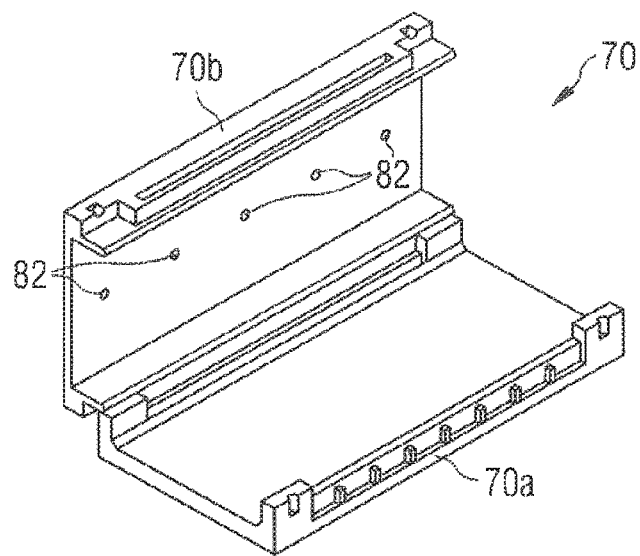
FIGS. 5A and 5B show a standardized support element of a mold in an open position and in a closed position, which element can be used in an apparatus for the continuous manufacture of components.
Figure 5B:
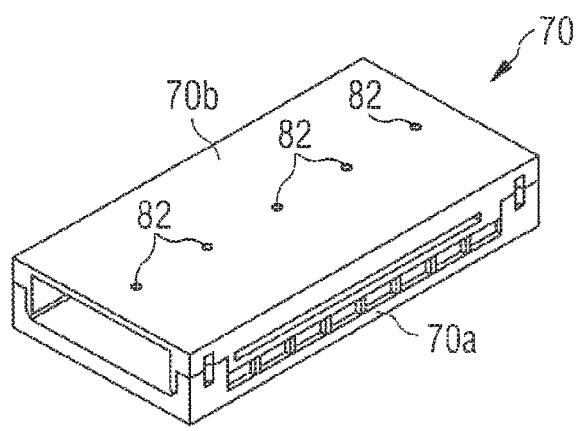
Figure 6A:
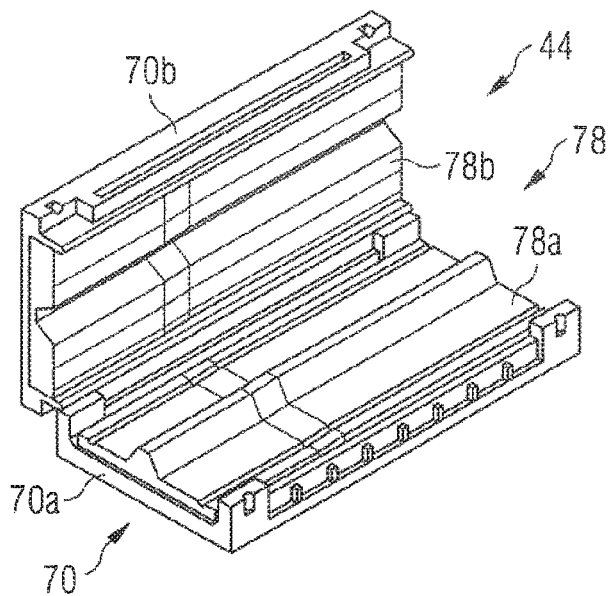
FIGS. 6A to 6D show different molds with a standardized support element and differently formed inserts that are detachably connectable to the support element and can be used in an apparatus for continuously manufacturing components from fiber-reinforced composites.
Figure 6B:
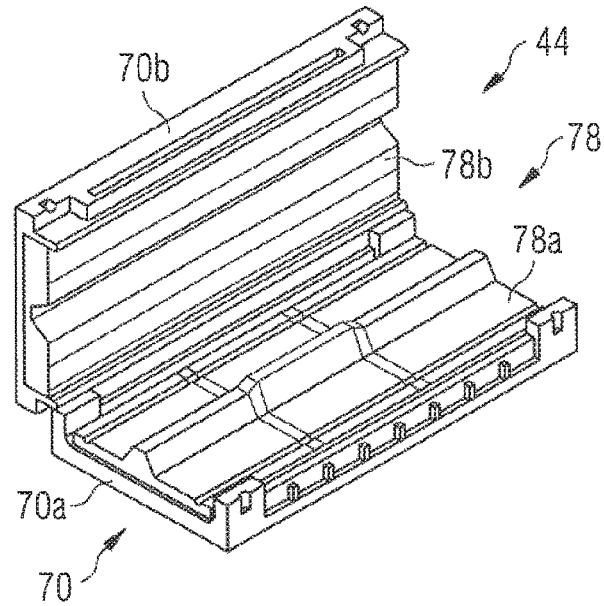
Figure 6C:
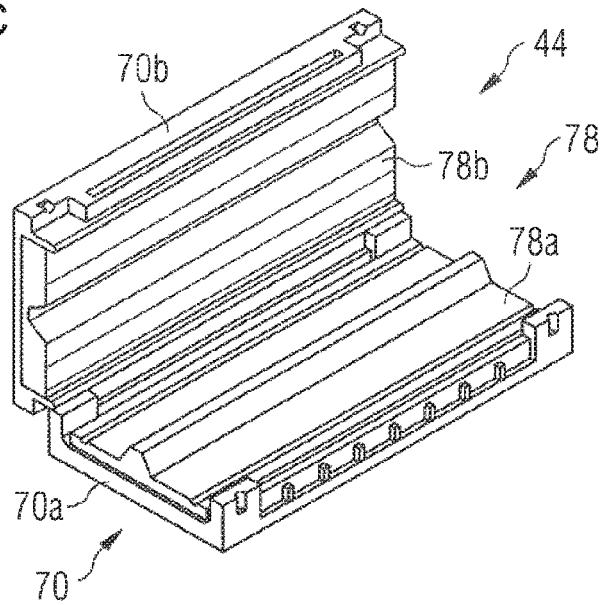
Figure 6D:
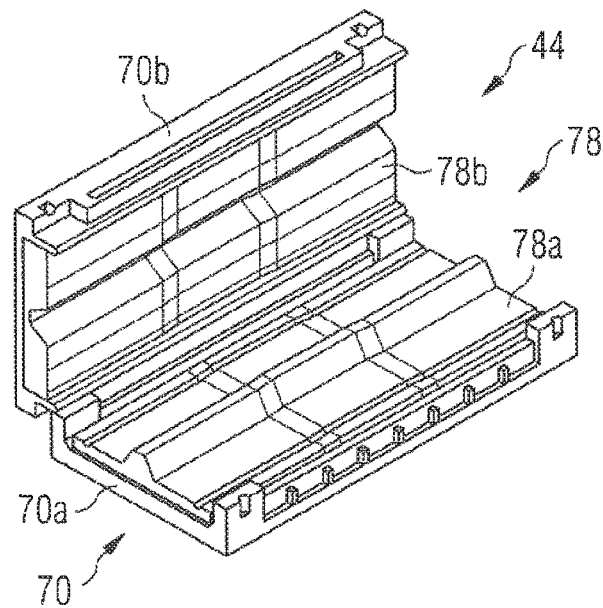
Figure 14:
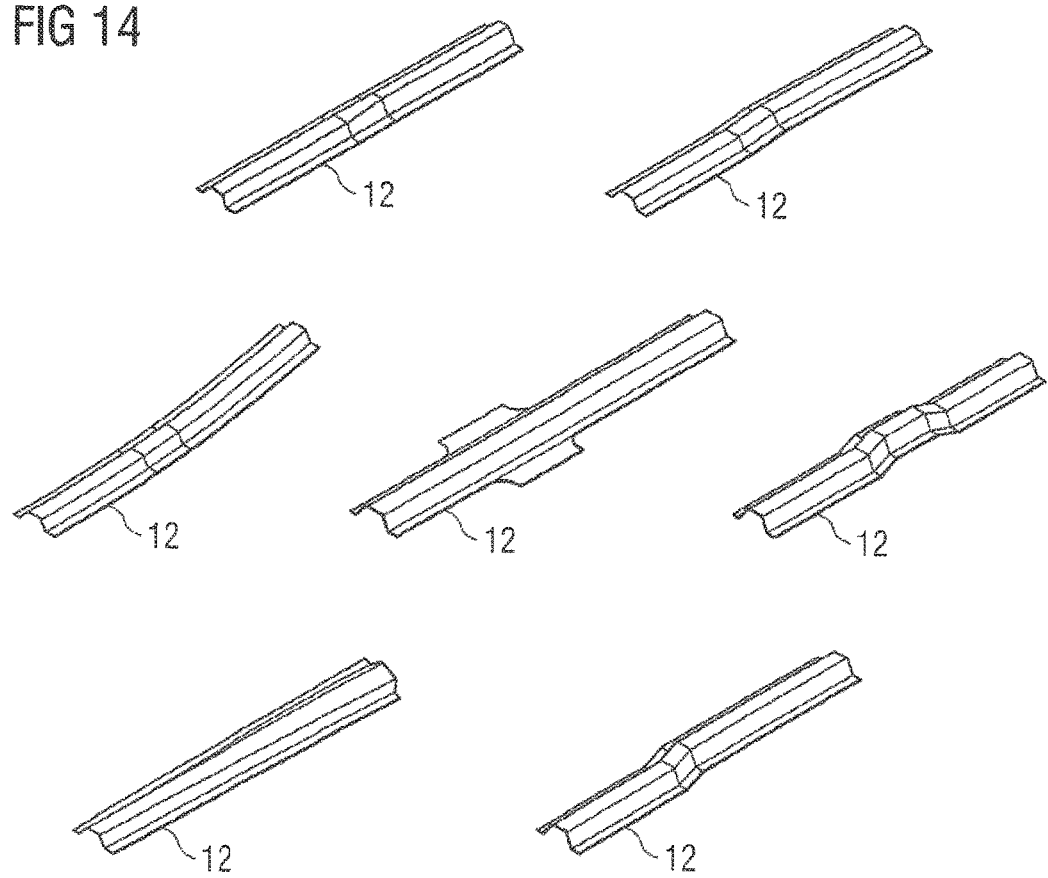
FIG. 14 shows different components that can be manufactured by means of an apparatus according to FIGS. 1 and 10 in a continuous manufacturing method.

The individual molds 44 differ in respect of their geometries, i.e., in respect of the geometries of cavities 56 provided in the molds 44 for receiving a section of the semifinished product 16, see FIGS. 3 and 4. The geometries of these cavities 56 correspond respectively to different desired geometries of different sections of the semifinished product 16. Components 12 can thus be formed by the forming device 36 that have a varying shape section-wise. In particular, aircraft structural components of complex shape, such as, e.g., stiffening elements, which contain ramps, offsets, locally limited projections, etc., can be manufactured continuously. Examples of such aircraft structural components are illustrated in FIG. 14.

Figure 11:
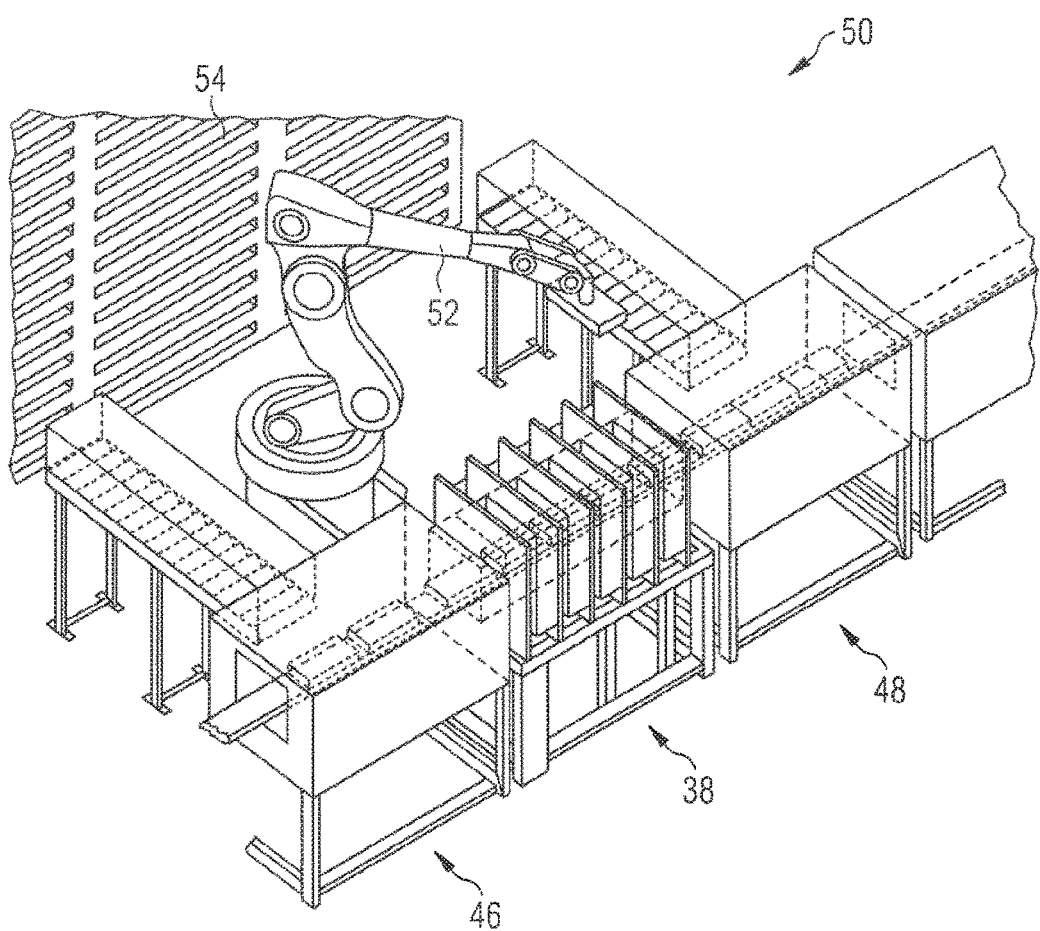
FIG. 11 shows a mold handling device, which can be used in an apparatus according to FIGS. 1 and 10.

After a mold 44 and consequently a section of the semifinished product 16 taken up in the mold 44 has been pressurized in the press 38 of the forming device 36, the mold 44 is released again from the section of the semifinished product 16 in a mold release station 48 of the forming device 36. The mold 48 is then taken over by a mold handling device 50. In the mold handling device 50, which, as illustrated in FIG. 11, may be operated automatically and may be equipped with a robot 52, the molds 44 are processed for reuse, wherein the processing of the molds 44 may comprise the cleaning of the molds 44 and the treatment of the molds with a release aid, in particular the insertion of a release film 64 into the molds 44. The reprocessed molds 44 may be returned directly to the mold application station 46 of the forming device 36. Alternatively to this, however, it is also possible to accommodate molds 44 that are not immediately reused in a mold storage facility 54. It is clear that the robot 52 may also remove molds 44 as required from the mold storage facility 54 and transfer them to the mold application station 46 of the forming device 36.

The molds 44 illustrated in FIGS. 3 and 4 each have a defined cavity 56 in their interior space between the mold sections 44a, 44b, which cavity is formed such that the molds 44 can be used to produce a section of an omega profile. Also provided in the interior space of the molds 44 is a receiving space 58 for receiving surplus synthetic material, which may be pressed out of the semifinished product 16 upon pressurization of the semifinished product 16 in the press 38 of the forming device 36. The receiving space 58 comprises a first section 60, which adjoins an edge of a semifinished product section taken up in the mold 44, i.e., an edge area of the cavity 56. The receiving space 58 further comprises a groove section 62, in which larger quantities of synthetic material may be taken up. The mold 44 shown in FIG. 4 differs from the mold 44 according to FIG. 3 in that a release film 64 is inserted into the cavity 56 of the mold 44, which film makes easier the release of the semifinished product section taken up in the mold 44 from the mold 44 in the mold release station 48.

As is evident in particular from FIG. 1, the pressing elements 40, 42 of the press 38 and the molds 44 are dimensioned in such a way that several molds 44, which are applied to sections of the semifinished product 16 arranged behind one another, can be pressurized simultaneously by the press 38. The molds 44 also have the same dimensions along the conveying direction F of the semifinished product 16.

Under the control of the control device 30, the operation of the conveying device 24 and the forming device 36 are controlled in such a way that the pressing elements 40, 42 of the press 38 are operated into a closed position, in order to pressurize the molds arranged between the pressing elements 40, 42 and consequently the sections of the semifinished product 16 taken up in these molds 44, see arrows P1 in FIG. 1. As long as the pressing elements 40, 42 exert pressure on the molds 44 and consequently on the semifinished product sections taken up in the molds 44, the pressing elements 40, 42 are moved together with the semifinished product 16 and the molds 44 in the conveying direction F of the semifinished product 16, see arrows P2 in FIG. 1. In particular, the pressing elements 40, 42 are moved in their closed position over a distance together with the semifinished product 16 and the molds 44 in the conveying direction F of the semifinished product 16, which distance substantially corresponds to the dimension of a mold 44 along the conveying direction F of the semifinished product 16.

Then the pressing elements 40, 42 are operated into an open position, see arrows P3 in FIG. 1, and moved opposite to the conveying direction F of the semifinished product, see arrows P4 in FIG. 1, until the pressing elements 40, 42 are arranged in a position in which they can be operated afresh into a closed position. In particular, the pressing elements 40, 42, after movement into their open position, are moved a distance opposite to the conveying direction F of the semifinished product 16, which distance likewise substantially corresponds to the dimension of a mold 44 along the conveying direction F of the semifinished product 16. As soon as the pressing elements 40, 42 are in their closed position again, they also pressurize a mold 44, which is applied to the semifinished product 16 behind the molds 44 arranged hitherto between the pressing elements 40, 42. In contrast to this, a mold 44 arranged at the foremost position in the conveying direction F of the semifinished product 16 is no longer located between the pressing elements 40, 42 and can be released from the semifinished product 16 in the mold release station 48. Due to this mode of operation, the molds 44 are pressurized in several pressing cycles, wherein the number of pressing cycles corresponds to the number of molds 44 that are located between the pressing elements 40, 42 of the press 38. Alternatively to this, however, the molds 44 may only be demolded following complete curing of a synthetic material contained in the semifinished product 16, in order to avoid warping of the semifinished product 16.

The device 10 further comprises a curing device 66, which is used to partially or completely cure curable synthetic material contained in the semifinished product 16. In the apparatus 10 according to FIG. 1, the curing device 66 comprises a tunnel kiln, through which the semifinished product 16 is guided. Finally, a cutting device 68 is present, which cuts the semifinished product 16 led away from the curing device 66 to a desired length, in order finally to produce the components 12. The cutting device 68 comprises a belt saw, which is supported movably so that it can be moved together with the semifinished product 16 in the conveying direction F of the semifinished product 16, in order to produce a cut running perpendicular to the conveying direction F.

FIGS. 5 to 9 illustrate a mold set that can be used in an apparatus 10 for continuously manufacturing components 12 from fiber-reinforced composites. The mold set comprises a standardized support element 70, which comprises a first partial section 70a and a second partial section 70b, see FIGS. 5A and 5B. The partial sections 70a, 70b may be connected to one another by a connecting device 72, which engages in respective grooves 74, 76, which are formed in the area of side walls of the partial sections 70a, 70b of the support element 70, see FIG. 9.

The mold set also comprises a plurality of differently shaped inserts 78, which may be detachably connected to the support element 70, see FIGS. 6A to D. In particular, the inserts 78 differ in respect of their geometries, wherein the geometry of each insert 78 corresponds to the desired geometry of a section of the component 12 to be manufactured. If a mold 44, which comprises a standardized support element 70 and an insert 78 detachably connected to the support element 70, is pressurized by the press 38 of the forming device 36, a section of the semifinished product 16 taken up in the mold 44 is also pressurized and is formed in this way according to the geometry of the insert 78.

Each insert 78 has a first insert section 78a and a second insert section 78b. The insert sections 78a, 78b may be inserted respectively in corresponding partial sections 70a, 70b of the support element 70, wherein the insert section 78a, as shown in FIG. 8, is supported elastically on a plurality of spring elements 80. As long as the support element 70 is not pressurized, the insert sections 78a, 78b are held at a desired distance from one another by the spring force of the spring elements 80, so that a cavity 56 present between the partial sections 78a, 78b has a shape that corresponds to the shape of a section of the semifinished product taken up in the cavity 56 before the molding step in the forming device 36 of an apparatus 10, see FIG. 7A. If the mold 44 is pressurized in the press 38 of the forming device 36, on the other hand, the insert sections 78a, 78b are moved towards one another against the spring force of the spring elements 80, so that the distance between the two insert sections 78a, 78b is reduced, see FIG. 7B. The section of the semifinished product taken up in the mold 44 is brought into the desired shape by this.

Molds 44 illustrated in the FIGS. 5 to 9 with a standardized support element 70 and an insert 78 detachably connected to the support element 70 have an injection duct 82 for the injection of a synthetic material into an interior space of the mold 44. The synthetic material may then be injected directly into the mold 44 and consequently into the section of the semifinished product, which is taken up in the cavity 56 between the insert sections 78a, 78b, before the mold 44 is pressurized in the press 38 of the forming device 36. A separate impregnating device can then be dispensed with.

Finally, in the molds 44 illustrated in FIGS. 5 to 9, which have a standardized support element 70 and an insert 78 detachably connected to the support element 70, a receiving space 58 is also provided for receiving surplus synthetic material, which may be pressed out of the semifinished product 16 upon the injection of the synthetic material into the mold 44 and into a section of a semifinished product taken up in the mold 44 and/or upon pressurization of the semifinished product section in the press 38 of the forming device 36. The receiving space 58 comprises in turn a first section 60 and a groove section 62 adjoining the first section 60 for receiving larger quantities of synthetic material.

Figure 10:
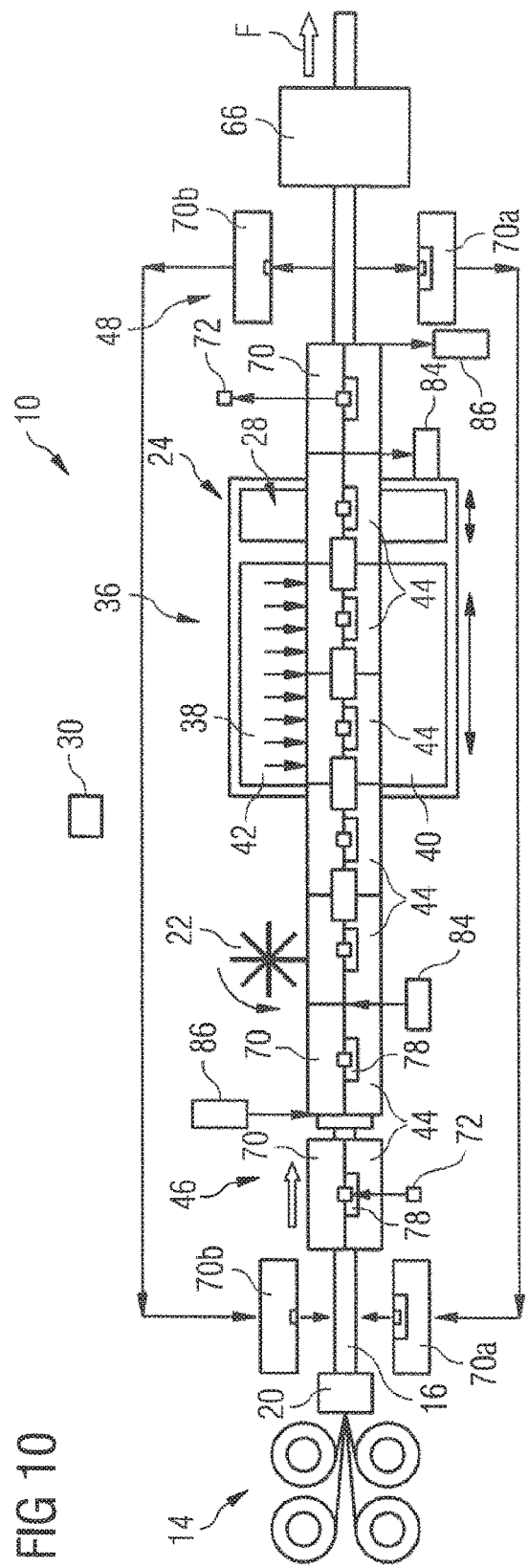
FIG. 10 shows an apparatus for continuously manufacturing components from fiber-reinforced composites, in which molds illustrated in FIGS. 5 to 9 are used.

FIG. 10 shows a variant of an apparatus 10 for continuously manufacturing of components 12 from fiber-reinforced composites, the forming device 36 of which is equipped with molds 44, which have respectively a standardized support element 70 and an insert 78 connected detachably to the support element 70. The molds 44 are processed for their use in the forming device 36 in a mold handling device, which is not shown in greater detail, in that the desired inserts 78 are inserted into the support elements 70. In the mold application station 46 of the forming device 36, the partial sections 70a, 70b of the support elements 70 are applied with the insert sections 78a, 78b inserted therein to opposing surfaces, i.e., an underside and an upper side of a section of the semifinished product 16. Then the partial sections 70a, 70b of the support elements 70 are connected to one another by a connecting device 72.

In the next step, the mold 44 applied to one semifinished product section is connected by a connecting element 84 to a mold 44, which is applied to a semifinished product section before the mold 44 relative to the conveying direction F of the semifinished product 16 through the apparatus 10. It can be prevented thereby that the molds 44 move relative to the semifinished product 16 and/or relative to one another, especially if a part of the molds 44 are pressurized in the press 38 of the forming device 36. The mold 44 is also sealed by a sealing element 86.

Before the mold 44 with the semifinished product section inserted therein is supplied to the press 38 of the forming device 36, a curable synthetic material is now injected into the mold 44 and the cavity 56 provided in the mold 44 between the insert sections 78a, 78b, and thus into the semifinished product section taken up in the cavity 56, by means of an impregnating device 22 integrated into the forming device 36 via the injection duct 82 formed in the mold 44. A separate impregnating mold can be dispensed with in the apparatus 10 according to FIG. 10, therefore. The mold 44 is then pressurized in the press 38 of the forming device 36, wherein the operation of the press 38 is controlled by the control device 30 as described above in connection with FIG. 1.

In the apparatus 10 according to FIG. 10, the conveying device 24 is also integrated with the forming device 36. The press 38 of the forming device 36 forms the first clamping device of the conveying device 24, connected downstream of which is a second clamping device 28, as was described above in connection with FIGS. 1 and 12. The press 38 forming the first clamping device and the second clamping device 28 are operated as described above in connection with FIGS. 1 and 12, in order to convey the semifinished product 16 through the apparatus.

Following completion of the pressing process, the mold 44 is uncoupled from the molds 44 arranged behind the mold 44 by releasing the connecting element 84. The sealing element 86 is also removed again before the mold 44 is finally also released again in the mold release station 48 from the semifinished product section, which has now been brought into the desired shape. Otherwise the construction and the mode of operation of the apparatus 10 according to FIG. 10 correspond to the construction and mode of operation of the arrangement illustrated in FIG. 1.

Although various features of the invention were described here with reference to specific embodiments of the invention, these features may be combined with one another in any way. For example, a connecting element 84 for connecting molds 44 applied consecutively to the semifinished product 10, or molds 44 provided with an injection duct 82, may also be used in the apparatus 10 according to FIG. 10, wherein the molds 44 may be designed as described in connection with FIG. 1 or may have a standardized support element 70 and differently shaped inserts 78.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An apparatus for continuously manufacturing components from fiber-reinforced composites comprising:
   a conveying device configured to convey a semifinished product containing reinforcing fibers through the apparatus, and
   a forming device configured to bring the semifinished product into a desired shape, and a press with a first pressing element and a second pressing element arranged opposite the first pressing element,
   the forming device further comprising a plurality of differently shaped molds pressurizable by the press, a mold application station arranged upstream of the press relative to the conveying direction of the semifinished product for applying a mold to a section of the semifinished product, and a mold release station arranged downstream of the press relative to the conveying direction of the semifinished product through the apparatus for releasing the mold from the section of the semifinished product.

2. The apparatus according to claim 1, further comprising a control device configured to control the operation of the conveying device and the forming device in such a way that
   the pressing elements of the press are operated into a closed position, in order to pressurize a first mold, which is applied to a first section of the semifinished product,
   the pressing elements are moved together with the first section of the semifinished product and the first mold in the conveying direction of the semifinished product as long as the pressing elements pressurize the first mold, and
   the pressing elements are operated into an open position and are moved relative to the first section of the semifinished product and the first mold opposite to the conveying direction of the semifinished product until the pressing elements are arranged in a position in which they can be operated afresh into a closed position, in order to pressurize a second mold applied to a second section of the semifinished product arranged downstream of the first section of the semifinished product relative to the conveying direction of the semifinished product through the apparatus.

3. The apparatus according to claim 1, wherein the pressing elements and the molds are dimensioned in such a way that a plurality of molds, applied to sections of the semifinished product arranged behind one another relative to the conveying direction of the semifinished product through the apparatus, are pressurizable at the same time by the press.

4. The apparatus according to claim 2, wherein the molds have the same dimensions along the conveying direction of the semifinished product and wherein the control device is configured to control the operation of the conveying device and the forming device in such a way that the pressing elements are moved in their closed position over a distance together with the first section of the semifinished product and the first mold in the conveying direction of the semifinished product, which distance substantially corresponds to the dimension of the molds along the conveying direction of the semifinished product, and wherein the pressing elements, following the movement into their open position, are moved by a distance opposite to the conveying direction of the semifinished product, which distance likewise substantially corresponds to the dimension of the molds along the conveying direction of the semifinished product.

5. The apparatus according to claim 1, wherein at least a part of the molds comprises a connecting element for connecting several molds, which are applied to sections of the semifinished product arranged behind one another relative to the conveying direction of the semifinished product through the apparatus.

6. The apparatus according to claim 1, further comprising at least one of:
   a supply device with at least one reel, onto which a semifinished product containing reinforcing fibers is wound,
   a preforming device for preforming the semifinished product,
   an impregnating device for impregnating the semifinished product with a synthetic material,
   a preheating device for preheating the semifinished product impregnated with synthetic material, a mold handling device for taking up and processing molds from the forming device and for transferring molds to the forming device, a curing device for curing a curable synthetic material contained in the semifinished product formed by the forming device, and a cutting device for cutting the semifinished product formed by the forming device into a desired shape.

7. The apparatus according to claim 1, wherein the conveying device comprises at least one of:

a first and a second clamping device, each adjustable between an open position, in which they release the semifinished product, and a closed position, in which they clamp the semifinished product between two clamping jaws, and which are movable in the conveying direction or opposite to the conveying direction of the semifinished product between a clamping position and a release position, wherein the control device is configured to control the operation of the first and the second clamping device in such a way that the first clamping device is in its open position and is moved opposite to the conveying direction of the semifinished product relative to the semifinished product from its release position to its clamping position, if the second clamping device is in its closed position and is moved in the conveying direction of the semifinished product together with the semifinished product from its clamping position to its release position, and wherein the first clamping device is in its closed position and is moved in the conveying direction of the semifinished product together with the semifinished product from its clamping position to its release position, if the second clamping device is in its open position and is moved opposite to the conveying direction of the semifinished product relative to the semifinished product from its release position to its clamping position, and two conveyor belts arranged opposite one another, configured to exert such a clamping force on a section of the semifinished product arranged between the conveyor belts that the semifinished product is moved by the conveying movement of the conveyor belts in its conveying direction, wherein at least one of the conveyor belts is supported elastically, wherein the conveying device is formed integral with the forming device.

8. A method for continuously manufacturing components from fiber-reinforced composites with the steps:

conveying a semifinished product containing reinforcing fibers by a conveying device, and forming the semifinished product by a forming device, which comprises a press with a first pressing element and a second pressing element arranged opposite the first pressing element, wherein in a mold application station of the forming device, which is arranged upstream of the press relative to the conveying direction of the semifinished product, differently shaped molds, which are pressurizable by the press, are applied to respective sections of the semifinished product, and in a mold release station arranged downstream of the press relative to the conveying direction of the semifinished product, are released again from the respective sections of the semifinished product.

9. The method according to claim 8, wherein the operation of the conveying device and the forming device are controlled by a control device in such a way that the pressing elements of the press are operated into a closed position, in order to pressurize a first mold, which is applied to a first section of the semifinished product, the pressing elements are moved together with the first section of the semifinished product and the first mold in the conveying direction of the semifinished product as long as the pressing elements are pressurizing the first mold, and the pressing elements are operated into an open position and moved opposite to the conveying direction of the semifinished product relative to the first section of the semifinished product and the first mold until the pressing elements are arranged in a position in which they can be operated once again into a closed position, in order to pressurize a second mold, which is applied to a second section of the semifinished product arranged downstream of the first section of the semifinished product relative to the conveying direction of the semifinished product through the apparatus.

10. The method according to claim 8, wherein a plurality of molds, which are applied to sections of the semifinished product arranged behind one another relative to the conveying direction of the semifinished product, are pressurized by the press at the same time.

11. The method according to claim 9, wherein the molds have the same dimensions along the conveying direction of the semifinished product and wherein the control device controls the operation of the conveying device and the forming device in such a way that the pressing elements are moved in their closed position over a distance together with the first section of the semifinished product and the first mold in the conveying direction of the semifinished product, which distance substantially corresponds to the dimension of the molds along the conveying direction of the semifinished product, and that following the movement into their open position, the pressing elements are moved by a distance opposite to the conveying direction of the semifinished product, which distance likewise corresponds substantially to the dimension of the molds along the conveying direction of the semifinished product.

12. The method according to claim 8, wherein several molds, which are applied to sections of the semifinished product arranged behind one another relative to the conveying direction of the semifinished product, are connected to one another by a connecting element before they are pressurized by the press, wherein the connection between the molds is released again following pressurization of the molds in the press.

13. The method according to claim 8, further comprising at least one of the further steps:

supplying a semifinished product containing reinforcing fibers by a supply device with at least one reel, onto which the semifinished product is wound, preforming the semifinished product by a preforming device, impregnating the semifinished product with a synthetic material by an impregnating device, preheating the semifinished product impregnated with a synthetic material by a preheating device, taking up and processing molds from the forming device and transferring molds to the forming device by a mold handling device, curing a curable synthetic material, which is contained in the semifinished product formed by the forming device, by means of a curing device, and cutting the semifinished product formed by the forming device into a desired shape by a cutting device.

14. The method according to claim 8, wherein the conveying device comprises at least one of:
- a first and a second clamping device, which are each adjustable between an open position, in which they release the semifinished product, and a closed position, in which they clamp the semifinished product between two clamping jaws, and which are movable in the conveying direction or opposite to the conveying direction of the semifinished product between a clamping position and a release position, wherein the control device is configured to control the operation of the first and the second clamping device in such a way that the first clamping device is in its open position and is moved opposite to the conveying direction of the semifinished product relative to the semifinished product from its release position to its clamping position, if the second clamping device is in its closed position and is moved in the conveying direction of the semifinished product together with the semifinished product from its clamping position to its release position, and that the first clamping device is in its closed position and is moved in the conveying direction of the semifinished product together with the semifinished product from its clamping position to its release position, if the second clamping device is in its open position and is moved opposite to the conveying direction of the semifinished product relative to the semifinished product from its release position to its clamping position, and
- two conveyor belts arranged opposite one another, which are configured to exert such a clamping force on a section of the semifinished product arranged between the conveyor belts that the semifinished product is moved by the conveying movement of the conveyor belts in its conveying direction, wherein in particular at least one of the conveyor belts is supported elastically, wherein the conveying device is formed integral with the forming device.

15. A mold set for use in a forming device of an apparatus for continuously manufacturing components from fiber-reinforced composites comprising:
- a standardized support element, which is pressurizable by a press of the forming device, and
- a plurality of differently shaped inserts that are detachably connectable to the support element.

16. The mold set according to claim 15, wherein at least one of
- the support element comprises a first partial section and a second partial section, wherein the first and the second partial section are connectable to one another by a connecting device, or
- the inserts that are detachably connectable to the support element comprise a first insert section and a second insert section, wherein at least one of the first and the second insert section is supported elastically in the support element, or
- an injection duct is provided for the injection of a synthetic material, or
- a receiving space is provided for receiving surplus synthetic material.

* * * * *